United States Patent
Clancy et al.

(10) Patent No.: US 12,132,636 B2
(45) Date of Patent: Oct. 29, 2024

(54) ELECTRONIC APPARATUS AND METHOD FOR LATENCY MEASUREMENTS AND PRESENTATION FOR AN OPTIMIZED SUBSCRIBER SERVICE

(71) Applicant: ARRIS Enterprises LLC, Suwanee, GA (US)

(72) Inventors: Paul A. Clancy, Duluth, GA (US); Ian G. Wheelock, Cork (IE)

(73) Assignee: ARRIS ENTERPRISES LLC, Horsham, PA (US)

( * ) Notice: Subject to any disclaimer, the term of this patent is extended or adjusted under 35 U.S.C. 154(b) by 265 days.

(21) Appl. No.: 17/491,731

(22) Filed: Oct. 1, 2021

(65) Prior Publication Data

US 2022/0150153 A1    May 12, 2022

Related U.S. Application Data

(60) Provisional application No. 63/112,953, filed on Nov. 12, 2020.

(51) Int. Cl.
*H04L 43/50*    (2022.01)
*H04L 43/0852*    (2022.01)
*H04L 43/0882*    (2022.01)

(52) U.S. Cl.
CPC .......... *H04L 43/50* (2013.01); *H04L 43/0852* (2013.01); *H04L 43/0882* (2013.01)

(58) Field of Classification Search
CPC .. H04L 43/50; H04L 43/0852; H04L 43/0882
See application file for complete search history.

(56) References Cited

U.S. PATENT DOCUMENTS

| | | | |
|---|---|---|---|
| 11,025,528 B1* | 6/2021 | Rothschild | .......... G06F 9/45558 |
| 11,863,465 B1* | 1/2024 | Nijim | .................... H04L 47/805 |
| 2006/0209711 A1 | 9/2006 | Kerpez | |
| 2015/0222504 A1 | 8/2015 | Srivastava | |
| 2020/0053018 A1 | 2/2020 | White et al. | |

(Continued)

OTHER PUBLICATIONS

International Preliminary Report on Patentability and Written Opinion issued May 25, 2023 in International Application No. PCT/US2021/053074.

(Continued)

*Primary Examiner* — Donald L Mills
(74) *Attorney, Agent, or Firm* — Wenderoth, Lind & Ponack, L.L.P.

(57) ABSTRACT

An electronic apparatus and method for enabling verification of performance improvements of an optimized service provided by a service provider receives a request to perform testing operations with respect to the optimized service, wherein the request includes one or more parameters for configuring the testing operations, transmits test packets to a test server on a standard path and on an optimized path, receives the test packets from the test server via the standard path and the optimized path, performs measurements related to timing of the test packets on the standard path and the test packets on the optimized path, respectively, processes the respective measurements related to timing to generate results of the testing operations, and outputs the results of the testing operations for display.

25 Claims, 10 Drawing Sheets

(56) References Cited

U.S. PATENT DOCUMENTS

2022/0021598 A1* 1/2022 Gupta .................... H04L 43/12
2022/0138081 A1* 5/2022 Varma ................ G06F 11/3684
  717/124

OTHER PUBLICATIONS

International Search Report and the Written Opinion of the International Searching Authority dated Jan. 20, 2022 in International (PCT) Application No. PCT/US2021/053074.
De Schepper Nokia Bell Labs B Briscoe K et al: "DualQ Coupled AQMS for Low Latency, Low Loss and Scalable Throughput (L4S); draft-ietf-tsvwg-aqm-dualq-coupled-05.txt", Loss and Scalable Throughput (L4S); draft-ietf-tsvwg-aqm-dualq-coupled-05 . txt; Internet-Draft : Transport Area Working Group (TSVWG), Internet Engineering Task Force, IETF; StandardWorkingDraft, Internet Society, No. 5, Jul. 3, 2018 (Jul. 3, 2018), pp. 1-37, XP015127642.

* cited by examiner

ELECTRONIC APPARATUS AND METHOD FOR LATENCY MEASUREMENTS AND PRESENTATION FOR AN OPTIMIZED SUBSCRIBER SERVICE

BACKGROUND

Various services, such as DOCSIS, can be optimized to obtain various performance improvements, such as reduced latency and jitter. Low Latency DOCSIS (LLD) technology developed by CableLabs for DOCSIS aims at achieving ~1 ms round-trip delay for time sensitive applications, including but not limited to online gaming. This is achieved by classifying the application traffic into two types: (1) "non-queue building" applications (NQB traffic) that do not need high link utilization (needing low latency), and (2) "queue building" applications (QB traffic) that send data quickly and expect the network to queue them (send data at a faster rate, but can tolerate higher latency).

There is an "Aggregate Service Flow" (ASF) feature available in DOCSIS 3.1 that enables grouping of one or more Service Flows mapped to a single cable modem (CM) or gateway (GW). Using the AST feature, two individual service flows are created: (1) an optimized service flow has an "LLD queue" for low latency DOCSIS (LLD) traffic (also referred to herein as "optimized path"), and (2) a classic service flow has a "classic queue" for regular (non-LID) traffic (also referred to herein as "standard path").

However, known techniques do not provide a mechanism for subscribers to verify whether and the extent to which such performance improvements are actually provided by a particular optimized service (e.g., as compared to an equivalent or related service that has not been optimized in the same or similar manner as the optimized service), such as a low latency DOCSIS service.

Thus, there is a need to enable a subscriber of an optimized service (e.g. a particular low latency service that is provided over DOCSIS) to validate the performance improvements. Similarly, there is a need to enable a service provider of the optimized service to analyze the performance improvements of their optimized service. The enhancements disclosed herein are primarily for use with CMs and GWs that can support Low Latency DOCS.IS, but could also be useful for older legacy CMs and GWs as a means to overcome buffer bloat. These enhancements can also be used with APs to condition traffic prior to reaching the CM, or within the CM.

SUMMARY

Accordingly, there is a need to provide an electronic device on a local area network (LAN) side (e.g., a cable modem, router, gateway, access point, customer premises equipment, set-top box, or the like) for enabling verification of performance improvements of an optimized service provided by a service provider. There is also a need to provide a remote server device on a wide area network (WAN) side (e.g., a service provider network, or a cloud network) for enabling verification of performance improvements of the optimized service provided by the service provider.

An aspect of the present disclosure provides an electronic apparatus for enabling verification of performance improvements of an optimized service provided by a service provider, the electronic device including a memory storing instructions, and a processor configured to execute the instructions to receive a request to perform testing operations with respect to the optimized service, wherein the request includes one or more parameters for configuring the testing operations, transmit test packets to a test server on a standard path and on an optimized path, receive the test packets from the test server via the standard path and the optimized path, perform measurements related to timing of the test packets on the standard path and the test packets on the optimized path, respectively, process the respective measurements related to timing to generate results of the testing operations, and output the results of the testing operations to be displayed in response to the request. The displayed results enable comparison of performance improvements between the optimized path and the standard path.

In an aspect of the present disclosure, the request is received from a computing device of a subscriber of the optimized service or from a remote server device of the service provider, which presents a graphical user interface (GUI) that enables editing of the parameters and initiation of the testing operations, and the results of the testing operations are transmitted to the computing device of the subscriber or the remote server device of the service provider, wherein the GUI enables viewing of the results of the testing operations.

In an aspect of the present disclosure, the GUI displays options associated with the one or more parameters for configuring the testing operations, including one or more of a particular application or game for which traffic is subjected to the testing operations, a short-term test with default parameters, a long-term test with default parameters, a default test server, a list of available test servers from which the test server is selected; and a custom test with configurable parameters. The configurable parameters of the custom test may include one or more of a field for entering a host name or IP address of a specific test server, a field for selecting or entering a protocol to be used for the measurements, a field for selecting or entering a minimum number of test packets, a field for selecting or entering a specified duration of the testing operations, and a field for selecting or entering a frequency or delay period between transmitting test packets.

In an aspect of the present disclosure, the electronic apparatus is further configured to count a number of test packets that take the optimized path and the standard path, respectively, and determine whether the number of test packets have exceeded a threshold value for the optimized path and the standard path.

In an aspect of the present disclosure, the electronic apparatus is further configured to perform passive latency measurements for the optimized path and the standard path by monitoring client-server interactions associated with an application or a device, and perform active latency measurements for the optimized path and the standard path on demand in response to a command of a subscriber or the service provider.

In an aspect of the present disclosure, the electronic apparatus is further configured to monitor traffic of an application or a device and report measurements or statistics derived from the traffic along with information provided via other components associated with one or more of DOCSIS, and MOCA, generate test background traffic with varying traffic loads and take directed measurements under the varying traffic loads, and run one or more latency tests in parallel with respect to different test servers or different applications.

In an aspect of the present disclosure, the electronic apparatus is further configured to store the results of the testing locally in the memory of the electronic apparatus, transmit the results of the testing to a remote server device to be stored remotely, wherein the results of the testing are saved to a user private area, a provider private area, or a public area of a remote database of the remote server device, and retrieve previous results of the testing from the remote database of the remote server device, wherein the results and the previous results are aggregated to update information displayed via a GUI. The remote database may further store results of testing operations that are received from one or more test servers configured to record the results of the testing operations with respect to both the optimized path and the standard path.

In an aspect of the present disclosure, the displayed results of the testing operations include one or more of raw numerical values with respect to the timing, a subset of key statistics of interest, a graph illustrating latency differences between the optimized path and the standard path, a comparison of concurrent latency measurements performed across the optimized path and the standard path to demonstrate the performance improvements, and an indication showing for which portions of a network latency has improved by providing the optimized path for communicating packets associated with an application or a device.

In an aspect of the present disclosure, the electronic apparatus is one of a cable modem (CM), a wireless router, a residential gateway (GW) device including an integrated CM and router, an access point (AP), or a customer premises equipment (CPE), wherein a CPE includes a set-top box (SIB) or other local network connected device.

An aspect of the present disclosure provides a method for enabling verification of performance improvements of an optimized service provided by a service provider, the method including receiving a request to perform testing operations with respect to the optimized service, wherein the request includes one or more parameters for configuring the testing operations, transmitting test packets associated with the application to a test server on a standard path and on an optimized path, receiving the test packets from the test server via the standard path and the optimized path, performing measurements related to timing of the test packets on the standard path and the test packets on the optimized path, respectively, processing the respective measurements related to timing to generate results of the testing operations, and outputting the results of the testing operations to be displayed in response to the request, The displayed results enable comparison of performance improvements between the optimized path and the standard path.

In an aspect of the present disclosure, the method further includes various operations, such as the steps performed by the electronic device as described above.

An aspect of the present disclosure provides a non-transitory computer-readable medium storing instructions for enabling verification of performance improvements of the optimized service provided by the service provider, the instructions when executed by a processor of an electronic device causing the electronic device to perform various operations, such as the steps performed in the method and/or by the electronic device as described above.

With the proposed solutions according to various aspects of the present disclosure, a client application can demonstrate (e.g., present latency or other performance-related data via a GUI) to subscribers and/or service providers of the optimized service various performance improvements of the enhanced LLD technology described herein.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples and not for the purpose of limiting the present disclosure as defined by the appended claims and their equivalents. The words and phrases used in the following description and claims are merely used to enable a clear and consistent understanding of the present disclosure. In addition, descriptions of well-known structures, functions, and configurations may be omitted for clarity and conciseness. Those of ordinary skill in the art will recognize that various changes and modifications of the examples described herein can be made without departing from the spirit and scope of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

Figure 1:
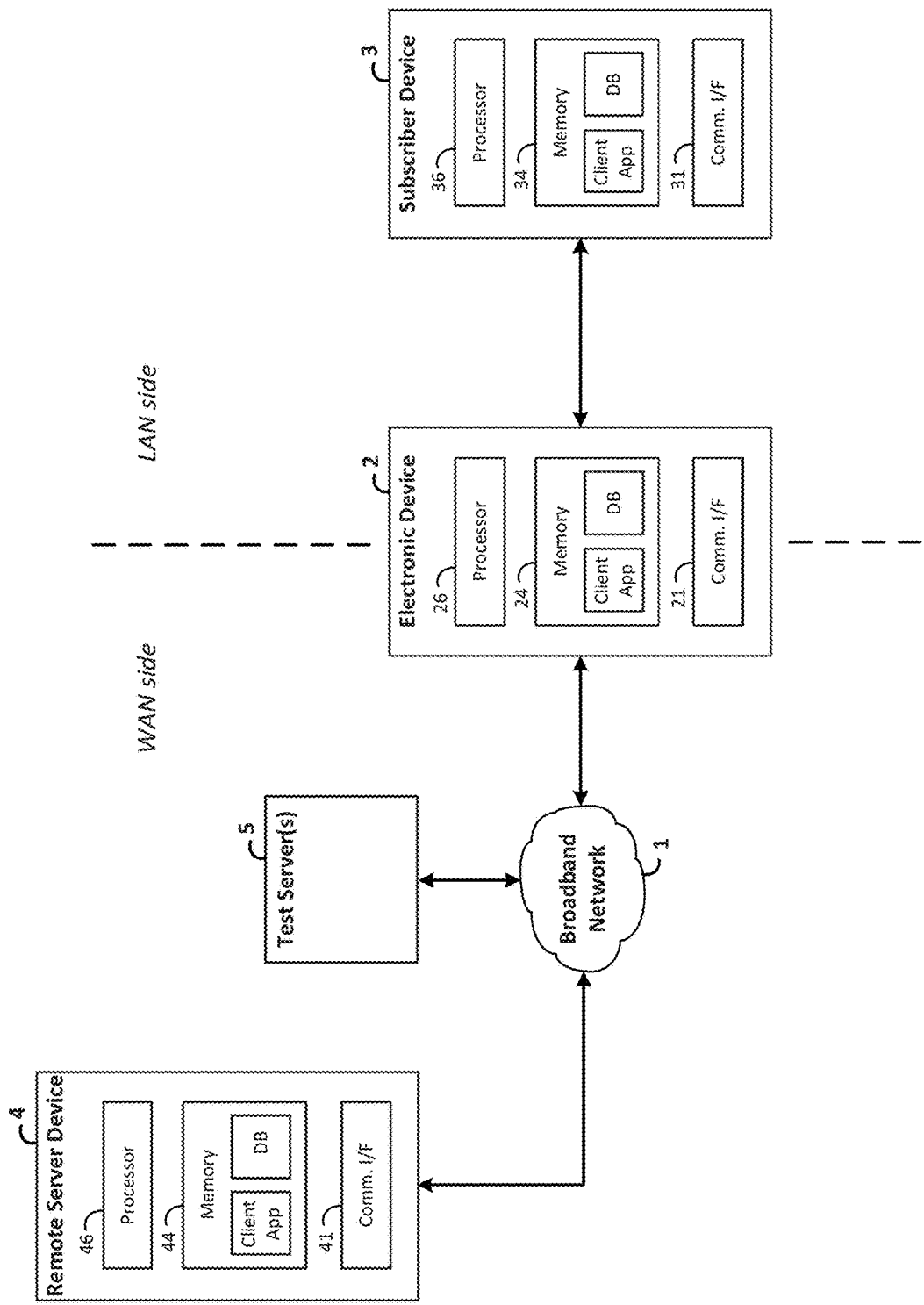
FIG. 1 is a schematic diagram of a system including an electronic device for enabling verification of performance improvements of the optimized service provided by the service provider, according to some example embodiments of the present disclosure.

FIG. 1 is a schematic diagram of a system including an electronic device for enabling verification of performance improvements of the optimized service provided by the service provider, according to some example embodiments of the present disclosure.

As shown in FIG. 1, the main elements of the system may include a broadband network I (e.g., HFC, xPON, FWA, etc.), an electronic device 2, a subscriber device 3, a remote server device 4, and one or more test server(s) 5. The electronic device 2 can deliver an optimized service (e.g., utilizing low-latency DOCSIS) to the subscriber device 3.

Although a single electronic device 2, subscriber device 3, remote server device 4, and test server 5 are shown in FIG. 1, the system may include multiple electronic devices 2 (e.g., a group of managed CMs/GWs), multiple subscriber devices 3 (e.g., different types of computing devices), multiple remote server devices 4 (e.g., in a service provider network, in an external cloud network), and/or multiple test servers 5 (e.g., different latency-sensitive applications, different games, different locations within a network, etc.).

The electronic device 2 may include a communications interface 21, a memory 24, and a processor 26. The communications interface 21 may include one or more WAN side connections (e.g., RI; coax, fiber optic, etc.) to the broadband network 1, and one or more LAN side connections (e.g., Ethernet port(s), 2.4/5/6/60 GHz Wi-Fi radio(s), etc.) to the subscriber device 3. The memory 24 may include a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software and data for controlling the general functions and operations of the electronic device 2 and performing management functions related to the other devices (e.g., the subscriber device 3) in the network in accordance with the embodiments described in the present disclosure. For example, the memory 24 may store a client application associated with the optimized service, and a database for storing various information associated with the optimized service (including test results). The processor 26 may include but is not limited to a central processing unit (CPU), a hardware microprocessor, a multi-core processor, a single core processor, a FPGA, a microcontroller, an ASIC, a DSP, or other similar processing device capable of executing any type of instructions, algorithms, or software for controlling the operation and functions of the electronic device 2 in accordance with the embodiments described in the present disclosure. The processor 26 controls the general operations of the electronic device 2 as well as performs management functions related to the other devices (e.g., the subscriber device 3) in the network. The electronic device 2 can be a hardware electronic device including but not limited to a cable modem (CM), a router, a gateway (GW) device having an integrated CM and router, an access point (AP), a customer premises equipment (CPE), a set-top box (STB), or the like.

In some example embodiments, a connection to the Internet can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example. The connection can further include as some portion thereof a broadband mobile phone network connection, an optical network connection, or other similar connections. For example, the connection can also be implemented using a fixed wireless access (FWA) connection that operates in accordance with, but is not limited to, 3rd Generation Partnership Project (3GPP) Long Term Evolution (LTE) or 5G protocols. It is also contemplated by the present disclosure to provide connections between the electronic device 2 and a WAN, a a VPN, MANs, WLANs, SANs, a DOCSIS network, a fiber optics network (e.g., FTTH, FTTX, or HFC), a PSDN, a global Telex network, or a 2G, 3G, 4G or 5G network, for example.

The subscriber device 3 may include a communications interface 31, a memory 34, and a processor 36. Some of these components may be the same, similar, or different from the components in the electronic device 2. The subscriber device 3 can be a hardware electronic device including but not limited to a smartphone, a tablet, a PC or MAC, a gaming console, a Smart TV, etc.

The LAN side may also include additional client devices not shown in FIG. 1 such as, for example, hand-held computing devices, personal computers, electronic tablets, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the electronic device 2. Additionally, the client devices of the LAN can be a Smart TV or a streaming media decoder (SMD) that is capable of decoding audio/video content, and playing over OTT or MSO provided content received through the electronic device 2.

The remote server device 4 may include a communications interface 41, a memory 44, and a processor 46. Some of these components may be the same, similar, or different from the components in the electronic device 2 and/or the subscriber device 3. The remote server device 4 can be various different types of computing devices, which may be part of a service provider network or an external cloud network. The test server(s) 5 may include the same, similar, or different components as described above.

The client application may include the same, similar, or different functionality at each of the electronic device 2, the subscriber device 3, and the remote server device 4. For example, the client application at the subscriber device and/or the remote server device can enable initiation of testing operations, configuration of parameters for the testing operations, and displaying of results of the testing to the subscriber and/or the service provider. The client application at the electronic device 2 can receive commands associated with latency tests, perform various measurements with respect to latency or other performance-related factors, analyze the measurements to generate results, and output the results of the latency tests to the subscriber device 3 and/or the remote server device 4 for presentation to the subscriber and/or the service provider.

In general, it is contemplated by the present disclosure that the electronic device 2 includes various components or computing devices operable to receive, transmit, process, store, and/or manage data and information associated with the system, which encompasses any suitable processing device adapted to perform computing tasks consistent with the execution of computer-readable instructions stored in a memory or a computer-readable recording medium (e.g., a non-transitory computer-readable medium). This applies similarly with respect to the subscriber device 3, the remote server device 4, and the test server(s) 5, Further, any, all, or some of the computing components in the electronic device 2 may be adapted to execute any operating system, including Linux, UNIX, Windows, MacOS, DOS, and ChromeOS as well as virtual machines adapted to virtualize execution of a particular operating system, including customized and proprietary operating systems. The electronic device 2 is further equipped with components to facilitate communication with other computing devices over the one or more network connections to local and wide area networks, wireless and wired networks, public and private networks, and any other communication network enabling communication in the system. This applies similarly with respect to the subscriber device 3, the remote server device 4, and the test server(s) 5.

Optimized Service—Low-Latency DOCSIS (LLD):

FIGS. 2A-D are diagrams illustrating a process for enhancing classification of packets in a network, according to some example embodiments of the present disclosure.

As mentioned above. Low Latency DOCSIS (LLD) technology reduces round-trip delay for time-sensitive applications by classifying the application traffic into two types: (1) "non-queue building" applications (QB traffic) that do not need high link utilization (needing low latency), and (2) "queue building" applications (QB traffic) that send data quickly and expect the network to queue them (send data at a faster rate, but can tolerate higher latency). The "Aggregate Service Flow" (ASF) feature available in DOCSIS 3.1 enables grouping of one or more Service Flows mapped to a single cable modem (CM) or gateway (GW). Using the ASF feature, two individual service flows are created: (1) an optimized service flow has an "LLD queue" for low latency DOCSIS (LLD) traffic (also referred to herein as "optimized path"), and (2) a classic service flow has a "classic queue" for regular (non-LLD) traffic (also referred to herein as "standard path").

LLD technology also provides a Queue Protection (QP) function, which can score an individual flow's contribution to the growth of the queue. The QP function identifies the traffic flow(s) contributing to the growth of the LLD queue delay, and moves those packets to the classic queue to avoid or prevent the LLD queue from being flooded.

Some applications may not classify traffic accurately as LLD traffic, which may result, in that traffic flow contributing to the growth of the LLD queue delay, thereby impacting other genuine LLD traffic flows. Therefore, a mechanism may be provided by extending the embedded QP mechanism to enable individual GWs/CMs to identify and correct such traffic flows, and propagate this information to the network endpoints responsible for marking traffic. The QP functionality is extended to notify the router (which may be embedded together with the cable modem in a gateway device, or a separate device that is externally connected to the cable modem) when it redirects future packets from LLD flows to the classic service flow, which enables future packets from the traffic flow to be marked accurately.

The CM can provide the indication about the traffic type to an application running on the gateway (or router device connected behind the CM), when the packets are moved from the LLD queue to the classic queue as part of the extended QP function. These indications from the CM may include traffic flow details in the form of 5-tuple values (source IP address, destination IP address, protocol in use, source port number, destination port number).

Further, to avoid duplication of every CM/GW needing to identify the same traffic as "queue building" traffic (classic traffic, not LLD traffic), the information learned by one CM/GW can be propagated to a remote application (e.g., an "aggregator") running on the wide area network (WAN) side (e.g., in a server of the service provider network or a cloud network), which then notifies other associated CMs/GWs to automatically make the correction for identical traffic.

The CM can also periodically check on the classic flows, and if it identifies low latency behavior for a flow in the classic queue, it can be indicated to the aggregator on the WAN side and/or the router/GW on the LAN side in the same fashion so packets of that flow can be correctly marked as LLD traffic when the CM moves those packets to the LLD queue.

The received data associated with the traffic is sent to a machine learning (ML) logic in the aggregator application, whether running on the router/GW on the LAN side or running on the server on the WAN side. The ML algorithm will train a model to identify these kinds of LLD traffic and classic traffic and tag the packets accordingly, such that the packets will get placed into the appropriate queue (classic vs. LLD), respectively. When the notifications are sent to the remote aggregator on the WAN side, the notifications can then be circulated to any or all CMs/GWs that can be remotely managed.

Example Use Ease at the Router on the LAN Side:

Referring to FIGS. 2a-2d. The router 220 may be a standalone device behind the CM 210, or may be integrated together with the CM 210 in a gateway device (e.g., the electronic device 2). The embedded or standalone router monitors the packets received from the client devices in the LAN. In most modern CMs/GWs, hardware acceleration is supported wherein only the first few packets from a session take a slow path, after which the rest of the packets for that session take a fast path.

If an incoming traffic flow is tagged as "LLD" (e.g., in the IP header DSCP/ECN fields), but the ML logic categorizes it as "non LLD" (classic traffic), then the router will modify the DSCP/ECN fields as "non LLD" for the packets on the slow path, and will notify the hardware accelerator module so that packets on the fast path for the same session will get re-marked as "non LLD" accordingly. Thus, this traffic flow will get placed into the classic queue, which will avoid or prevent growth of the LLD queue delay. Similarly, if the ML logic categorizes an incoming traffic flow as "LLD" (which is learned as part of the notification of a potential low latency flow from classic flows) but the incoming traffic is tagged as "non LLD", the router will modify the IP header fields as "LLD" so that it gets classified to the ILD queue, and notify the hardware accelerator module to update the marking as "LLD" for the packets on the fast path for the same session.

Figure 2A:
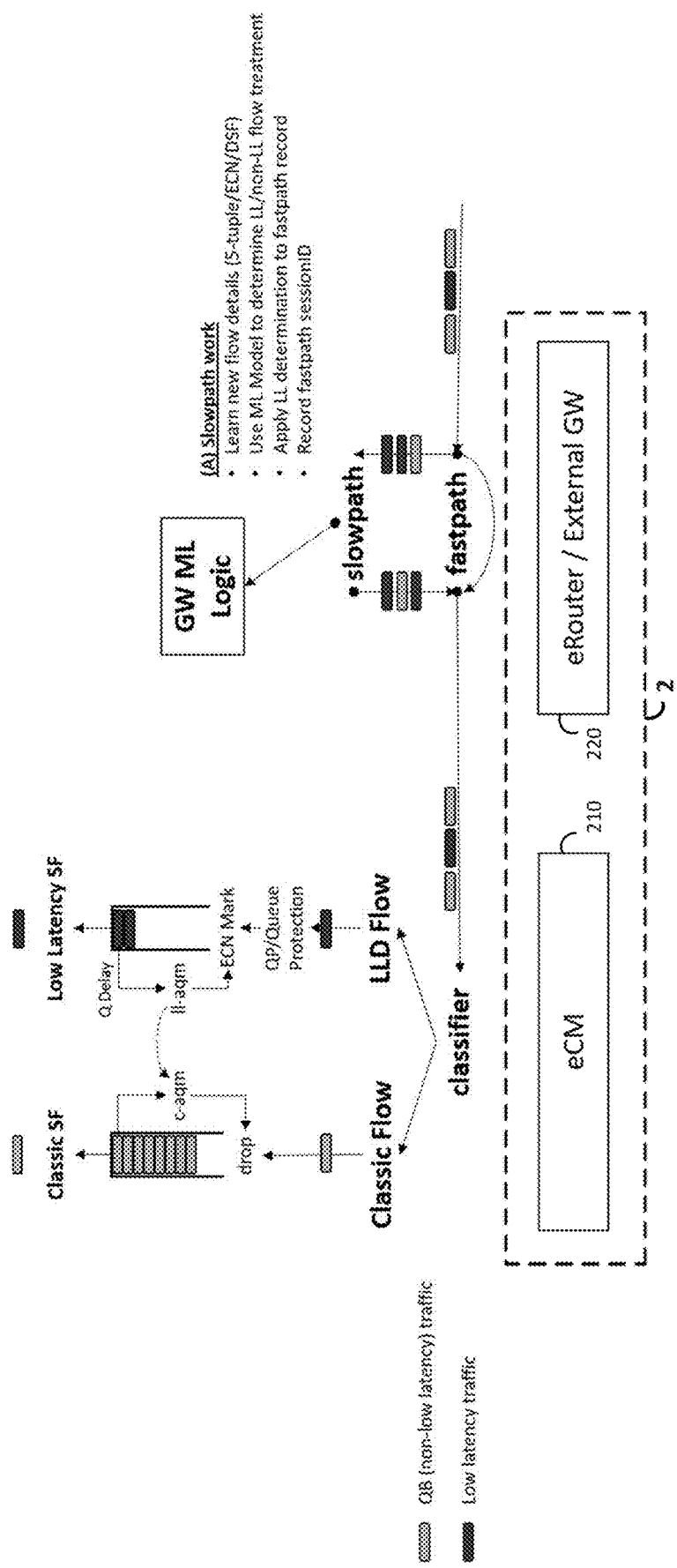
FIGS. 2A-D are diagrams illustrating a process for enhancing classification of packets in a network, according to some example embodiments of the present disclosure.
Figure 2B:
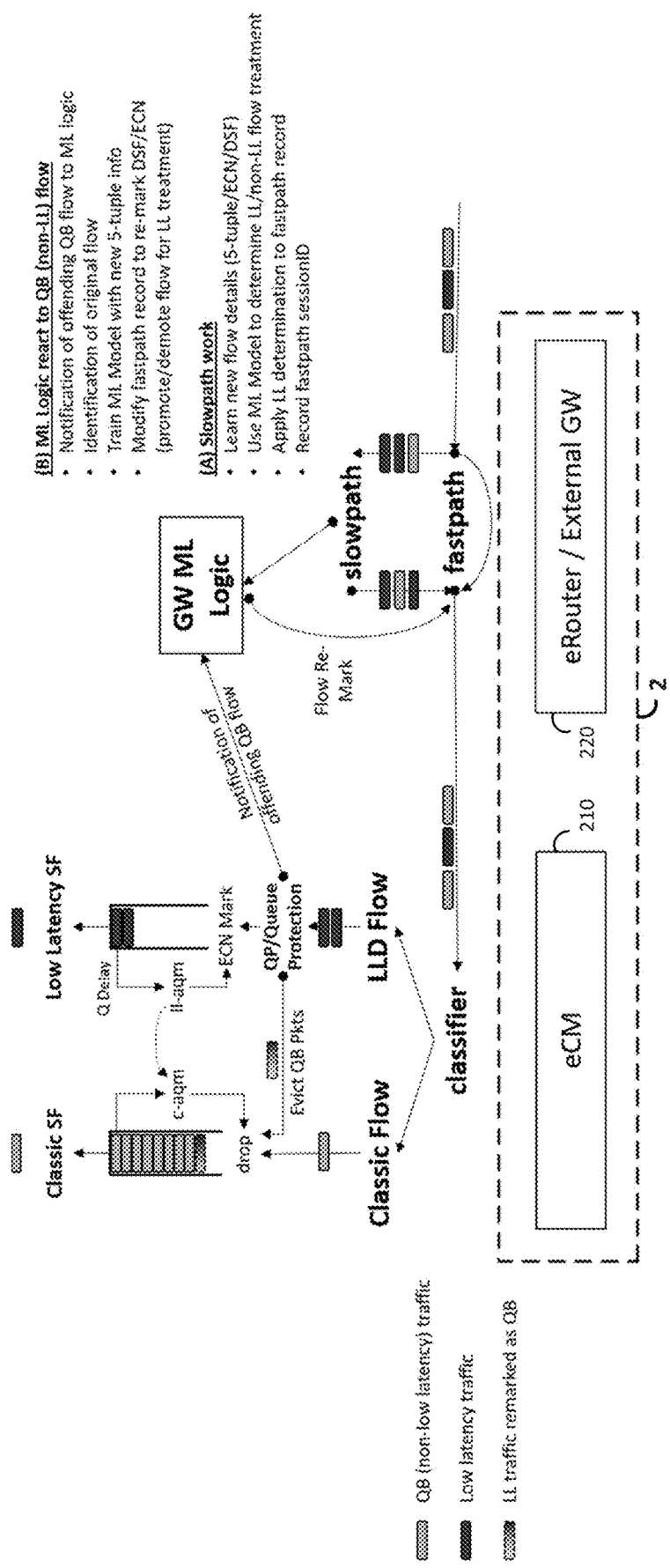

As shown in FIGS. 2a-2d, the training of Machine Learning (ML) logic to correctly classify traffic flows as low latency DOCSIS (LLD) traffic or classic (non-LLD) traffic may include various phases (A-D):

(A) First, as shown in FIG. 2a, the "slowpath work" phase may include learning new flow details (5-tuple/ECN/DSF), using the ML model of the router (GW ML Logic) to determine LLD/non-LLD flow treatment, applying the low latency determination to the fastpath record, and recording the fastpath sessionID.

(B) Second, as shown in FIG. 2h, the "ML Logic react to QB flow" phase may include notification of an offending QB flow (non-:LLD traffic) to the ML logic, identification of the original flow, training the ML model with new 5-tuple info, and modifying the fastpath record to re-mark DSF/ECN (promote/demote flow for low latency treatment).

Figure 2C:
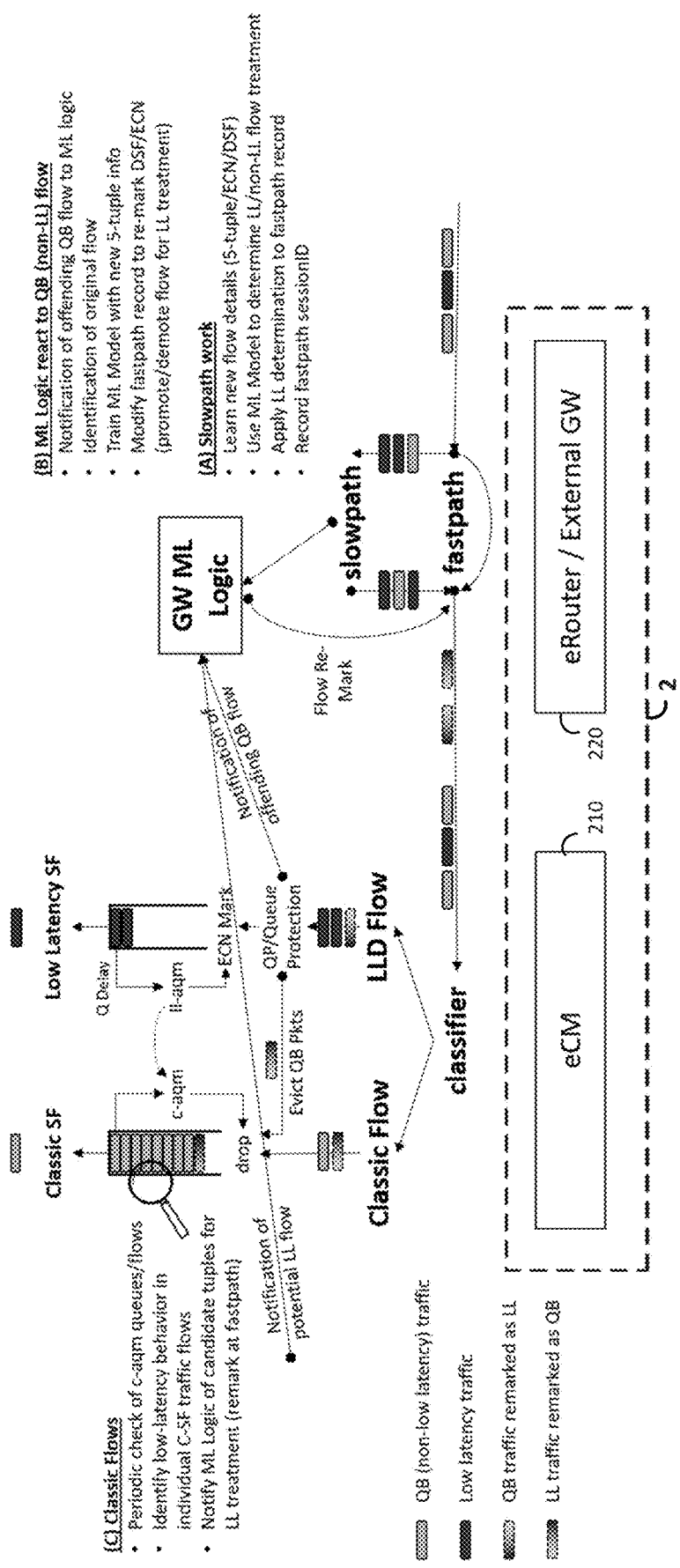

(C) Third, as shown in FIG. 2c, the "Classic Flows" phase may include periodically checking of classic queues/flows, identifying low-latency behavior in individual C-SF (classic service flow) traffic flows, and notifying the ML logic of candidate 5-tuples of a potential LLD flow for low latency treatment (re-mark at fast path).

Figure 2D:
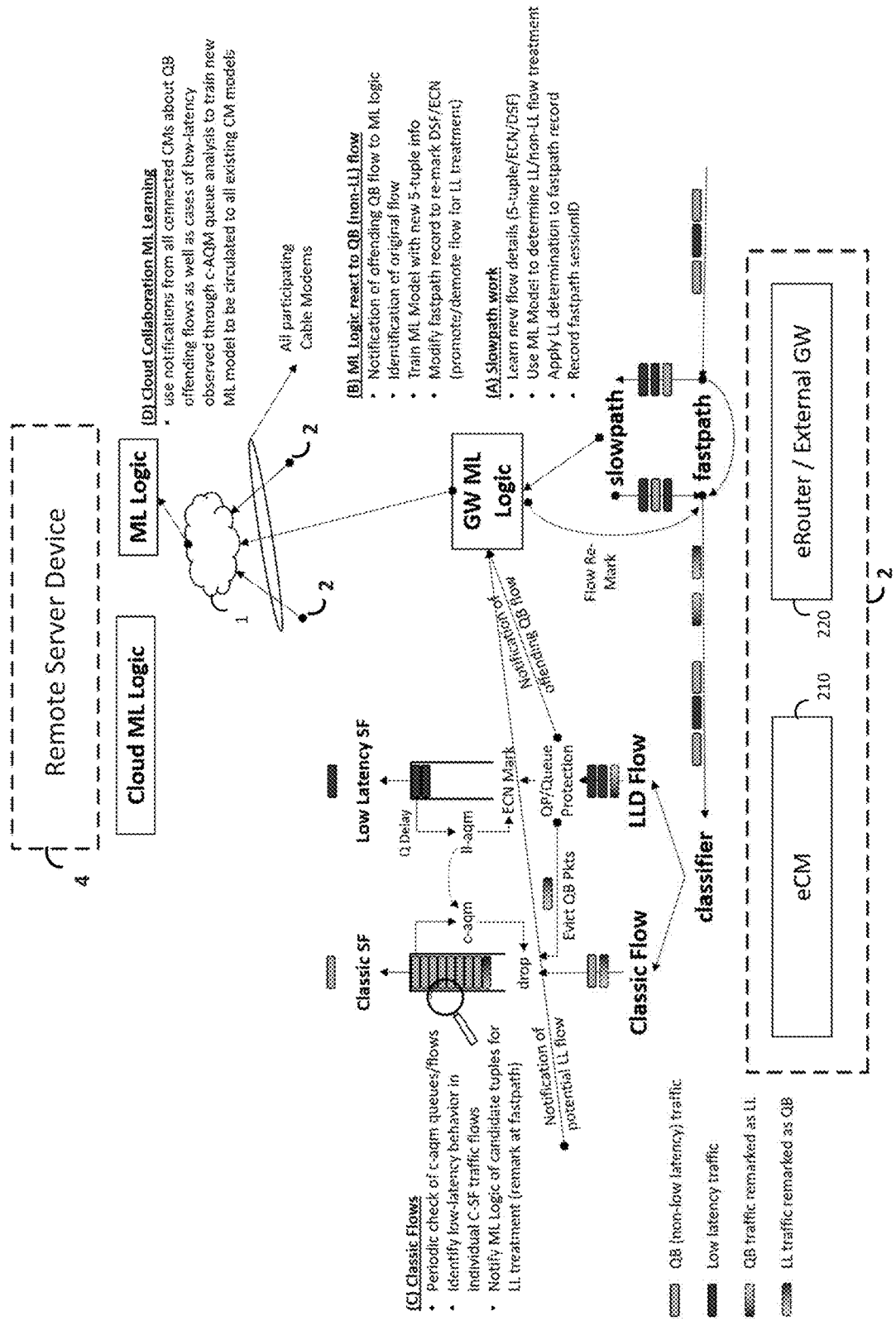

Example Use Case at the Remote Server Device on the WAN Side:

Referring to FIG. 2d, a server device in the service provider network or a cloud network (e.g., the remote server device 4) can include Machine Learning (ML) logic to aggregate and distribute the packet classification information among the managed CMs/GWs. The ML logic in the service provider network or cloud network may also be referred to as an aggregator application.

(D) Fourth, as shown in FIG. 2d, an additional "Cloud Collaboration ML Learning" phase may include receiving the notifications from all connected CMs about offending QB flows (non-LLD traffic) as well as cases of low-latency observed through the classic queue analysis, and using these notifications to train a new ML model to be circulated to all existing CM models.

When the aggregator application is running on a remote server (e.g., in the service provider network or in a cloud network), the aggregator application uses the traffic flow details (5-tuples) from the trained ML model, and the data is fed to multiple end points in the network (including other CMs/GWs) to appropriately tag identical traffic flows, thereby improving the efficiency of the Low Latency DOCSIS technology. Thus, delay due to queue building in the CM/GW by such traffic will automatically be eliminated, as those packets will now be moved to the classic queue instantly.

Verification of Performance Improvements of an Optimized Service Provided by a Service Provider:

As mentioned above, there is a need for a mechanism that enables subscribers and service providers to verify whether and the extent to which performance improvements are actually provided by a particular optimized service (e.g., latency and jitter reduction as compared to an equivalent or related service that has not been optimized in the same or similar manner as the optimized service), such as a low latency DOCSIS service.

Figure 3:
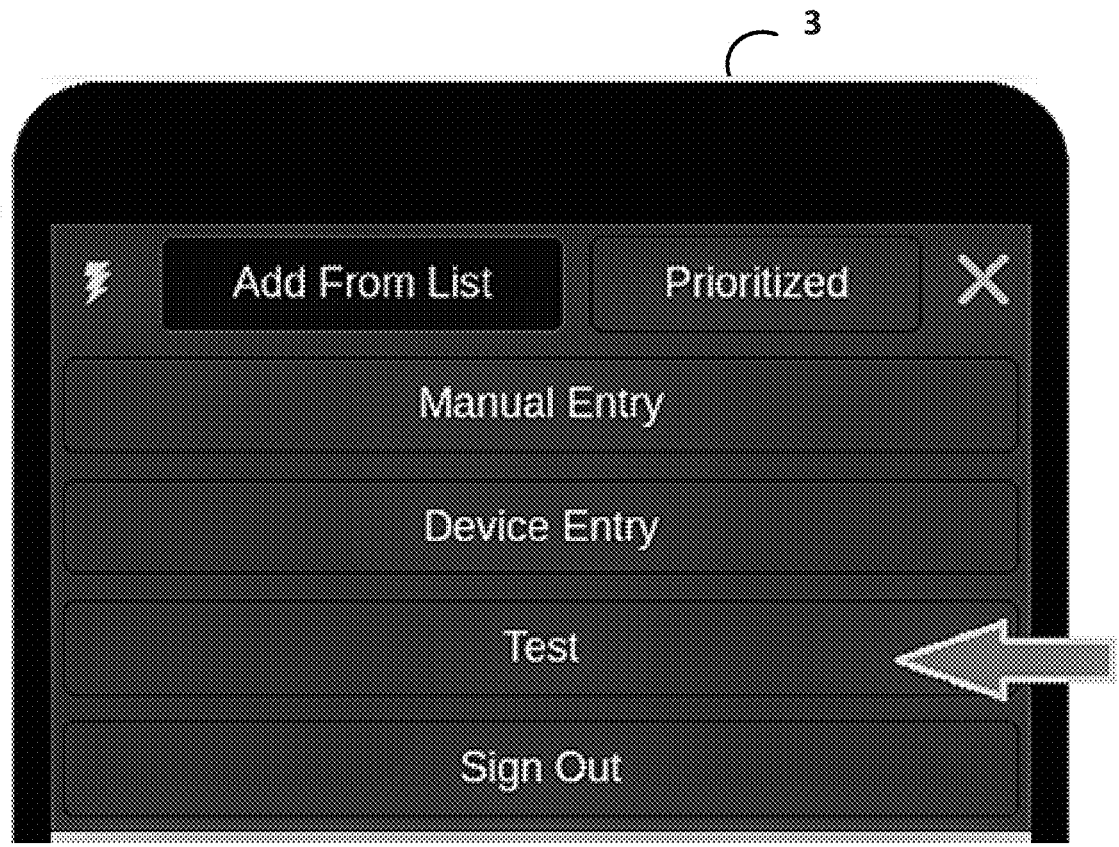
FIGS. 3-4 are diagrams illustrating screens associated with a client application for enabling verification of performance improvements of an optimized service provided by a service provider, according to some example embodiments of the present disclosure.
Figure 4:
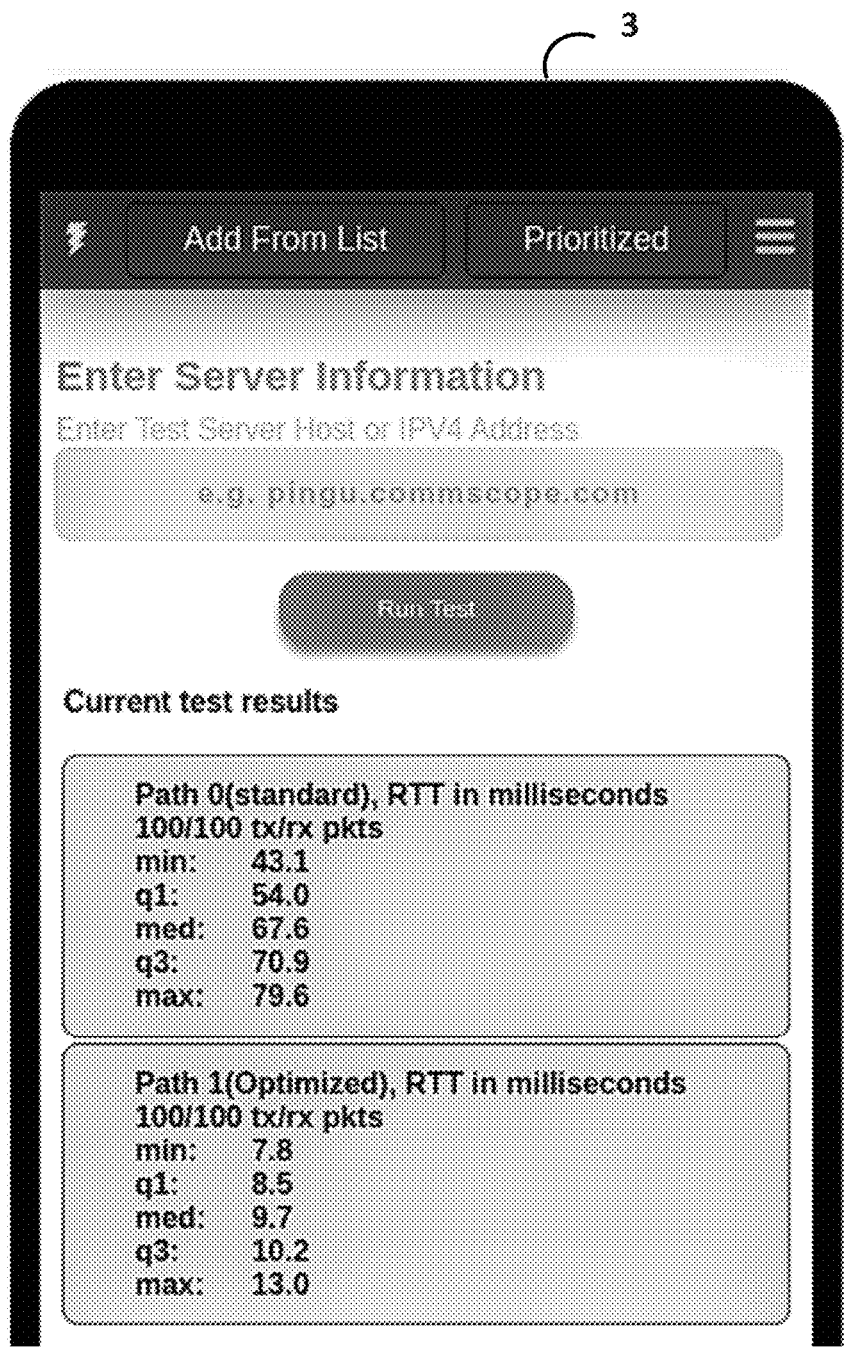

FIGS. 3-4 are diagrams illustrating screens associated with a client application for enabling verification of performance improvements of an optimized service provided by a service provider, according to some example embodiments of the present disclosure, According to aspects of the present disclosure, a "client" application may be provided to enable a subscriber and/or a service provider to validate (verify or confirm) whether and the extent to which certain performance improvements, including but not limited to latency and/or jitter, are achieved by an optimized service.

The client may be implemented as executable code (e.g., Linux, IOS, Android, Windows, etc.) in the form of a mobile application or a webpage-based application. Users may interact with the client via a graphical user interface (GUI), which may be presented to the subscriber using their mobile device or other computing device and/or to the service provider using their remote server device.

FIG. 3 depicts an example test screen. The test screen is presented to a user via the client application, and enables the user to initiate a latency test and/or configure various parameters for the testing operations. FIG. 4 depicts an example server entry and results screen. The user may be prompted for a host name or IP address of a test server prior to running the test and displaying the results. A list of available test servers, from which a particular test server may be selected by the user, may be presented via the GUI. In some example embodiments, some results of background measurements may also be available to be reported (e.g, "current test results"). Although FIGS. 3-4 illustrate screens presented to the subscriber via the subscriber device 3, the same or similar screen could also be presented to the service provider via the remote server device 4.

The software being used may include, but is not limited to, five separate components: (1) client software at the CM/GW for running the tests, (2) server software at the remote server device for hosting a remote database (e.g., in the service provider network or a cloud network), (3) server software at the test server for receiving and sending test packets and background traffic loads, (4) client software at the subscriber's mobile device or other computing device for displaying results of a current test received from the CM/GW or results of previous tests retrieved from the remote server device via the CM/GW, and (5) client software at the service provider's computing device for displaying test results received from the CM/GW or results of previous tests retrieved from the remote server device via the CM/GW.

In some example embodiments, the client is resident on an electronic device 2, such as the subscriber's cable modem (CM) or residential gateway (GW) device. In some other example embodiments, however, it also possible that the client may be implemented on various other types of customer premise equipment (CPE), including but not limited to a set-top box (STB), an access point (AP), a standalone router, a computing device (e.g., desktop computer, laptop, tablet, mobile device, etc.), or the like. For example, testing operations can be configured and/or initiated by the subscriber from their mobile device (e.g., via a mobile application on a smartphone or tablet) or other computing device (e.g., via a webpage-based application on a mobile device, laptop or desktop PC, MAC, Linux, etc.). Similarly, results of the testing operations can be displayed to the subscriber via their mobile device or other computing device in the form of various numerical values and/or graphs).

Testing operations may be initiated using the client, which instructs or commands the CM/GW to transmit and receive traffic to/from a test server on the WAN side (e.g., in the service provider network or a cloud network) by sending test messages along the two different paths (the standard path for regular traffic vs. the optimized path for low-latency traffic). The results of these testing operations can show the performance improvements that are actually delivered via the optimized service.

The client may be configured to know which particular service (or services) the subscriber desires to be optimized. In such cases, the client may take measurements with respect to a specific service (e.g., a game service). These may be passive measurements or active measurements (e.g., according to default parameters and/or customizable parameters set by the subscriber and/or the service provider of the optimized service) with respect to timing, delay, latency, jitter, etc.

The client can communicate with one or more test servers) that run special software for reflecting test packets that are received from the CMs/GWs back to the respective CM/GW that transmitted the test packets. Similarly, the CM/GW may run special software for reflecting test packets that are received from the test server(s) back to the respective test server that transmitted the test packets.

Various parameters for the testing operations may be automatically configured in the client application(e.g., preset or default parameters) and/or manually configured by the user (e.g., subscriber-specific parameters, application-specific parameters, etc.). For example, the test parameters may include, but are not limited to, a particular application or game for which traffic is to be prioritized, selection of one or more available test servers from a list, entry of the name or IP address of a specific test server, a minimum number of test messages (packets), a specified duration for running the testing operations, a frequency or delay period between transmission of test packets, a format for displaying results of the test (e.g., raw numerical values, a few key statistics of interest, graphs illustrating some important differences between the two paths, etc.) in a user-friendly manner, or the like. These configurable parameters can be set by a user (e.g., the subscriber and/or the service provider) using graphical user interface (GUI) techniques in some example embodiments, or using voice-recognition techniques in some other example embodiments.

The client that is resident on the CM/GW will perform the testing operations, which may involve taking various types of measurements (e.g., with respect to timing, delay, latency, jitter, etc.) for the optimized path and the standard path, respectively: (1) "passive/opportunistic measurements" by monitoring actual traffic communication between devices and the servers they communicate with, and (2) "directed measurements" by sending test packets on demand and periodically reporting at various intervals at the direction of the subscriber or the service provider.

The subscriber or the service provider can set up the client to continuously perform passive monitoring measurements that do not control or interfere with interactivity of the application (but may display an alert at the application, for example). Passive latency measurements may be taken by timing client-server interactions (e.g., TCP handshake). During each of the testing operations, background traffic rates (upstream/downstream) that are present during the testing are recorded by the client at the CM/GW. Additionally or alternatively, the subscriber or the service provider can set up the client to perform active measurements for a desired duration of time and report results periodically to the remote database. For example, the client may perform a number of measurements over a short time frame and quickly update results to allow a near instant indication of performance.

The directed measurements can also be initiated by the service provider or the subscriber. The directed tests are periodic in nature. The subscriber or the service provider can set up the client to run a long-term test with lower frequency of test packets (longer delay period between transmissions), and report the results of the long-term test back to the database at the remote server device (e.g., the cloud database). For long-turn monitoring, the client may send two packets (1 standard path, 1 optimized path) every 5 seconds, and upload a summary to the database at the remote server device every 15 minutes. For "live" testing (refer to FIG. 5), the client may send a packet on each path four times a second and provide the eight raw measurements every second to the database. The subscriber or the service provider can also set up the client to run a shorter-term test (e.g., only lasts for 30 seconds), with high frequency of test packets (short delay period between transmissions, such as 100 milliseconds). In this instance, the client at the CMs/GWs can run the short-term test for the desired duration of time (30 seconds), and report the results of the short-term test back to the database at the remote server device (e.g., the cloud database) after that time period has elapsed. However, these examples are intended to be illustrative only and are non-limiting in nature.

The client may record a count of packets that take the optimized path and the standard path, respectively. The client can determine whether the number of packets on both the optimized path and the standard path have exceeded a threshold value, respectively. The client may also record circumstances where the optimized path is unavailable (e.g., flow too high).

The test messages may be in the form of packets with time stamps. The CM/GW may periodically transmit the test messages to the test server over both paths for at least a minimum length of time (e.g., 30 seconds, 5-15 minutes, etc.). Once a sufficient number of the test messages are received back from the test server over both paths, the client software at the CM/GW can analyze the timing to determine latency improvements of the optimized path as compared to the standard path. The client software at the CM/GW measures the amount of time taken for the respective packets to come back from the test server via both paths (e.g., round-trip-time, or RTT), checks the time differences, and processes the measurements to generate results of the testing. Then, the results may be displayed to the user via the GUI so that the user can compare the timing on both paths and verify performance improvements achieved by the optimizing service.

The results of the testing (e.g., measured values associated with timing, delay, latency, jitter, etc.) may be saved locally and stored at the GW/CM, and/or may be transmitted from the GW/CM to a subscriber device on the LAN side (e.g., smartphone, tablet, computer, CPE, STB, etc.) and/or to a remote server device on the WAN side (e.g., an optimizing server of the service provider, a cloud database, etc.). In some example embodiments of remote storage, the results of the testing can be saved to a user private area, a provider private area, and/or a public area (e.g., for enabling comparisons between different CMs/GWs, applications/games, subscribers, devices, networks, etc.).

The client at the CM/GW can push a request for a "test" to the test server directly, or the client may indirectly signal the test server via the remote server device. The client at the CM/GW can report results of a current test to the remote server device (e.g., to update stored results in the remote database). The client at the CM/GW can also read stored results of previous tests from the remote server device.

The results of the testing (e.g., the measured values of latency and jitter) may be presented to the subscriber via a web browser that displays a webpage associated with the CPE (e.g., the gateway, cable modem, etc.) and/or via execution of an application or mobile app associated with said devices (e.g. a Web app, an Android app, an IOS app, a Windows app, a MAC app, etc.). Such an application may be configured to read the results of the testing from the relevant database location (e.g., local storage at the CPE or remote storage at a remote server device in the service provider network or an external cloud network), and present to the subscriber the measured values (e.g., of latency and jitter) in numerical and/or graphical form via a graphical user interface (GUI) shown on a display device associated with the CPE (e.g., a user interface of the CPE a display screen of a television in communication with the CPE, a display screen of a subscriber computing device in communication with the CPE, etc.).

In some example embodiments, the provider of the service may process the results of the testing prior to presentation to the subscriber. For example, there may be some additional information that is available to show for which portions of the network the latency has improved. The client may monitor existing traffic and report measurements and/or statistics derived from the existing traffic along with information provided via other components. For example, on a gateway device, the other components may be associated with DOCSIS, MOCA, etc. The service provider will retrieve results for presenting upon a dashboard of Web interface or similar system.

In some example embodiments, there may be a single test server (e.g., a server associated with a particular application or game, or the remote server device on the WAN side that includes the database function). In some other example embodiments, there may be multiple different test servers on the WAN side at (possibly) different geographic locations within the service provider's network. These different test servers can run tests simultaneously and/or separately at different times.

In some example embodiments, there is a database component implemented at a remote server device on the WAN side (e.g., a server in the service provider network or a cloud network). The client at the CM/GW can be controlled via the database function at the remote server device. The service provider and/or user can write commands into the database, while the client is immediately informed when these writes occur and thus takes immediate action in response. For example, testing operations can be configured and/or initiated by the service provider from the remote server device (e.g., via a management dashboard). Similarly, results of the testing operations can be displayed to the service provider via the remote server device (e.g., in the form of various numerical values and/or graphs with respect to an individual CM/GW and/or groups of related CMs/GWs). The interfaces to the remote database can be provided in many ways (e.g., computing devices, web-based or mobile app).

Using the provider interface (e.g., the management dashboard), the service provider can set thresholds for generating alarms or triggering alerts. The service provider can also run multiple tests simultaneously in parallel with respect to different CMs/GWs, different groups of CM/GWs, different low-latency applications or application types, or combinations thereof. The service provider may be able to identify problem areas of the network based on the results of the testing operations. Similarly, the subscriber can run multiple tests in parallel with respect to different test servers and/or different applications/application types.

It should be noted that some optimizations may be marginal, and therefore more difficult to detect, under light traffic conditions. On the other hand, some optimizations may be substantial, and hence easier to detect, under heavy traffic conditions. Thus, in some example embodiments, the client may be configured to generate background traffic to allow directed measurements be taken under varying traffic loads.

For some measurements, a server such as the remote server device or the test server can also record the results of the testing (e.g., the measured values of latency and jitter), and make them available to the provider of the optimized service and/or to the subscriber via similar mechanisms described above.

Figure 5:
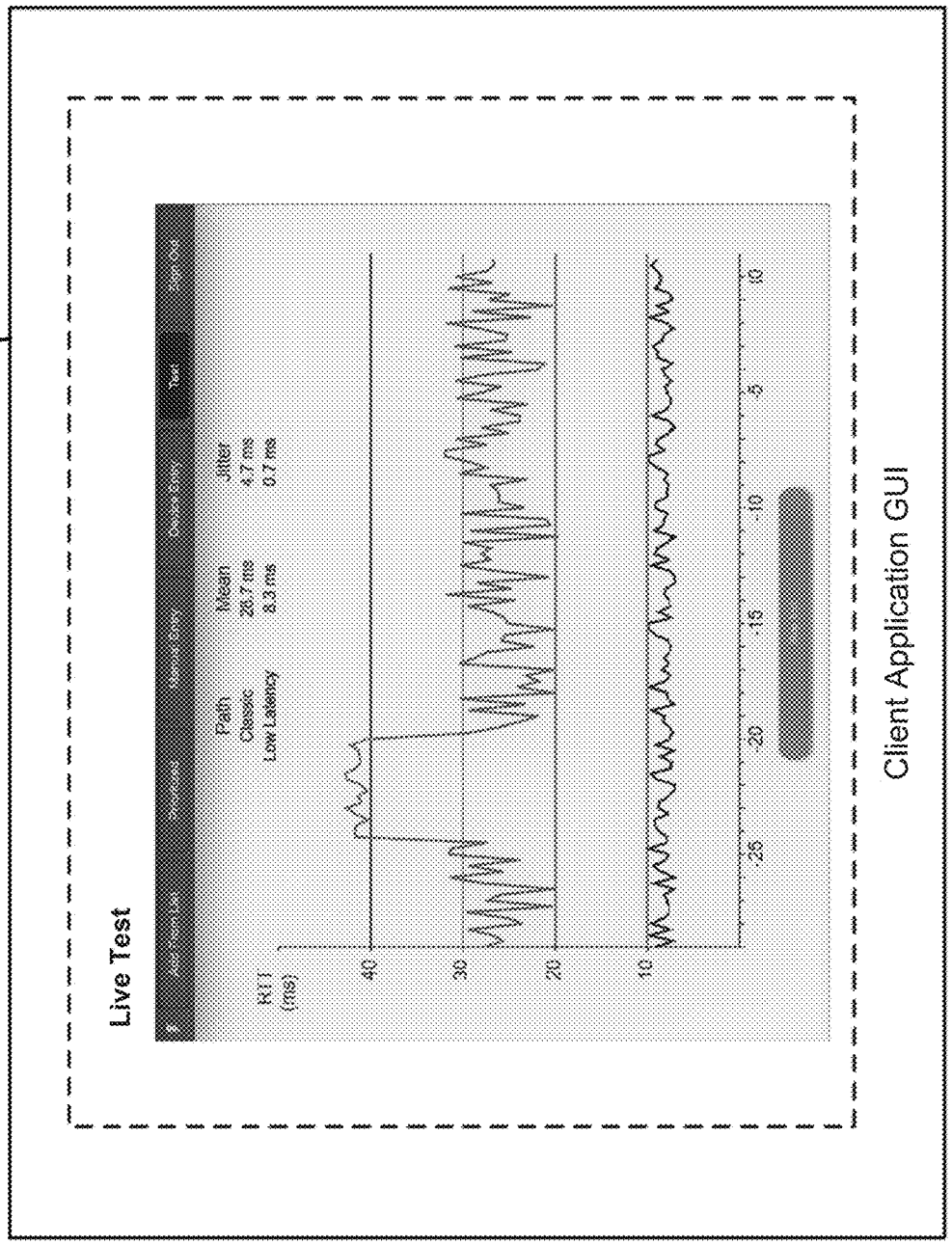
FIG. 5 is a diagram illustrating an example of live test results in the form of line graphs, according to an example embodiment of the present disclosure.

FIG. 5 is a diagram illustrating an example of live test results in the form of line graphs, according to an example embodiment of the present disclosure.

In FIG. 5, values of mean latency and jitter are shown for both the classic service flow (the standard path) and the low latency service flow (the optimized path), respectively. This may be an example of short-term monitoring described above. The lines on the graph can be generated during a "live test" and represent round-trip-time (RTT) in milliseconds over a relatively short testing interval. The interval could be controlled manually (e.g., via "stop test" button) or may be preset to a default timing value.

Figure 6:
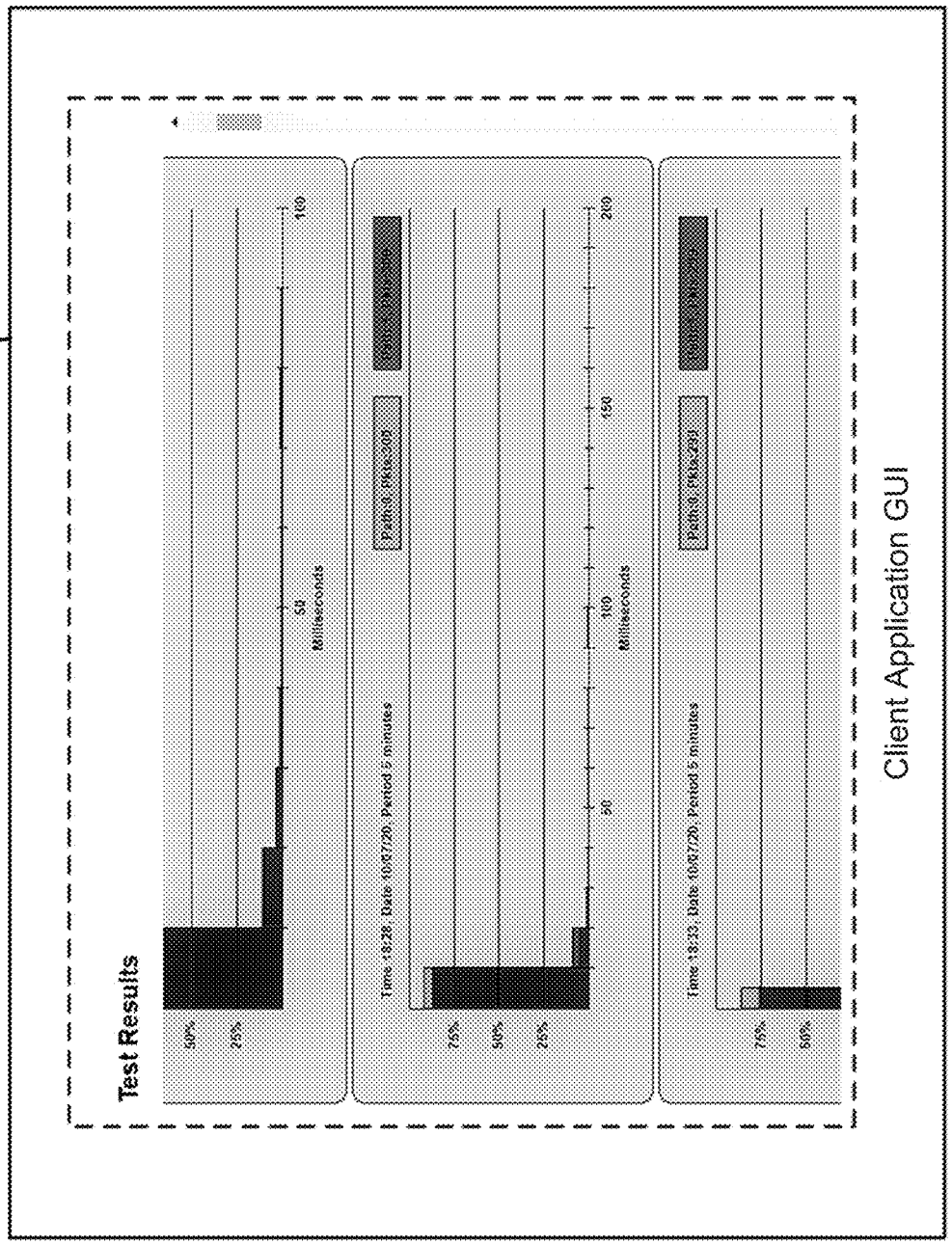
FIG. 6 is a diagram illustrating an example of test results in the form of bar graphs, according to an example embodiment of the present disclosure.

FIG. 6 is a diagram illustrating an example of test results in the form of bar graphs, according to an example embodiment of the present disclosure.

FIG. 6 illustrates an additional or alternative manner in which test results may be displayed, with performance improvements being shown as percentage differences on the bars of the graph. This may be an example of long-term monitoring described above. The subscriber or service provider may scroll through the results of several individual tests taken over time, and analyze any consistencies or differences. Each periodic test result has the corresponding time and date of the test shown on each graph.

The graphs shown in FIGS. 5-6 may be displayed to the subscriber via the webpage-based application or mobile application, and may be utilized by the subscriber to verify and compare performance improvements (e.g., with respect to latency) associated with the optimized service. Similarly, the graphs shown in FIGS. 5-6 may be displayed to the service provider via the client application (e.g., in a management dashboard). Although FIGS. 5-6 illustrate test results screens presented to the subscriber via the subscriber device 3, the same or similar test results screen could also be presented to the service provider via the remote server device 4. The test results screen of the remote server device 4 may also include various additional information with respect to multiple CMs/GWs (e.g., aggregated results), for example. Although the graphs are shown in the form of line graphs and/or bar graphs, it should be appreciated that various other graphical formats, numerical values, tables, indications, and/or visualizations are contemplated by the present disclosure.

Figure 7:
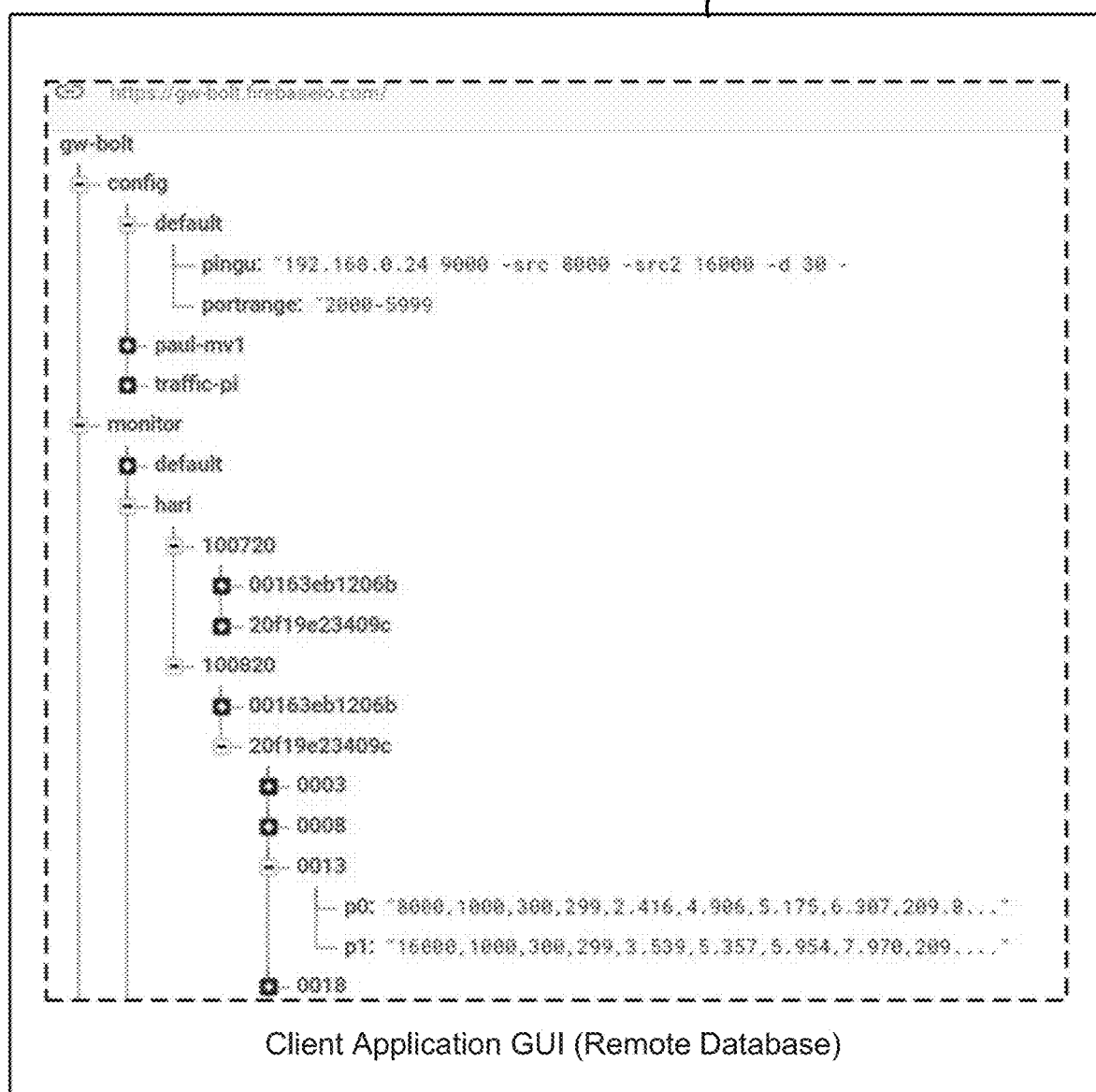
FIG. 7 is a diagram illustrating an example database associated with the optimized service that is stored in a remote server device, according to an example embodiment of the present disclosure.

FIG. 7 is a diagram illustrating an example database associated with the optimized service that is stored in a remote server device, according to an example embodiment of the present disclosure.

As described above, the remote server device 4 may be an electronic apparatus in the service provider network, or an electronic device in an external cloud network (e.g., cloud database). FIG. 7 depicts a cloud configuration of the test parameters (config/default/pingu), and monitoring results with respect to a group of managed CMs/GWs. See "monitor" shown for gateways in a group "hari" that are broken down by date (MIMDDYY) and further by the gateway MAC address. The results also have a timestamp (here shown as HHMM. The information shown in FIG. 6 may be stored in the remote database in the memory 44 of the remote server device 4.

In some example embodiments, the electronic device 2 (which may include a gateway device with an integrated cable modem and router, or a standalone CM and router, for example) may be programmed with instructions (e.g., controller instructions) to execute the optimizing service and testing operations, or may use its native software in some other example embodiments. It is assumed that the devices include their respective controllers or processors and their respective software stored in their respective memories, as discussed above, which when executed by their respective controllers or processors perform the functions and operations for enabling verification of the performance improvements associated with the optimized service, in accordance with the example embodiments of the present disclosure.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (webpage-based apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not, to be construed as a critical, required, or essential features or elements of any or all the claims. The invention is defined solely by the appended claims including any amendments made during the pendency of this application and all equivalents of those claims as issued.

What we claim is:

1. An electronic apparatus for enabling verification of performance improvements of an optimized service, the electronic apparatus comprising:
    a memory storing instructions; and
    a processor configured to execute the instructions to:
        receive a request to perform testing operations with respect to the optimized service, wherein the request includes one or more parameters for configuring the testing operations, and wherein the optimized service is a low latency service provided by a service provider;
        transmit test packets to a test server on a standard path and on an optimized path, wherein the optimized path is an optimized service flow for low latency traffic and the standard path is a service flow for regular non-low latency traffic;
        receive the test packets from the test server via the standard path and the optimized path;
        perform measurements related to timing of the test packets on the standard path and the test packets on the optimized path, respectively;
        process the respective measurements related to timing to generate results of the testing operations; and
        output the results of the testing operations to be displayed in response to the request,
        wherein the displayed results enable comparison of performance improvements between the optimized path and the standard path.

2. The electronic apparatus of claim 1, wherein:
    the request is received from a computing device of a subscriber of the optimized service or from a remote server device of the service provider, which presents a graphical user interface (GUI) that enables editing of the parameters and initiation of the testing operations; and
    the results of the testing operations are transmitted to the computing device of the subscriber or the remote server device of the service provider, wherein the GUI enables viewing of the results of the testing operations.

3. The electronic apparatus of claim 2, wherein the GUI displays options associated with the one or more parameters for configuring the testing operations, including one or more of:
    a particular application or game for which traffic is subjected to the testing operations;
    a short-term test with default parameters;
    a long-term test with default parameters;
    a default test server;
    a list of available test servers from which the test server is selected; and
    a custom test with configurable parameters, including one or more of:
    a field for entering a host name or IP address of a specific test server;
    a field for selecting or entering a protocol to be used for the measurements;
    a field for selecting or entering a minimum number of test packets;
    a field for selecting or entering a specified duration of the testing operations; and
    a field for selecting or entering a frequency or delay period between transmitting test packets.

4. The electronic apparatus of claim 1, wherein the processor is configured to execute the instructions to:
    count a number of test packets that take the optimized path and the standard path, respectively; and
    determine whether the number of test packets have exceeded a threshold value for the optimized path and the standard path.

5. The electronic apparatus of claim 1, wherein the processor is configured to execute the instructions to:
    perform passive latency measurements for the optimized path and the standard path by
    monitoring client-server interactions associated with an application or a device; and
    perform active latency measurements for the optimized path and the standard path on demand in response to a command of a subscriber or the service provider.

6. The electronic apparatus of claim 1, wherein the processor is configured to execute the instructions to one or more of:
    monitor traffic of an application or a device and report measurements or statistics derived from the traffic along with information provided via other components associated with one or more of Wi-Fi, DOCSIS, and MOCA;
    generate test background traffic with varying traffic loads and take directed measurements under the varying traffic loads; and
    run one or more latency tests in parallel with respect to different test servers or different applications.

7. The electronic apparatus of claim 1, wherein the processor is configured to execute the computer-readable instructions to:
    store the results of the testing operations locally in the memory of the electronic apparatus;
    transmit the results of the testing operations to a remote server device to be stored remotely, wherein the results of the testing operations are saved to a user private area, a provider private area, or a public area of a remote database of the remote server device; and
    retrieve previous results of the testing operations from the remote database of the remote server device, wherein the results and the previous results are aggregated to update information displayed via a GUI,
    wherein the remote database may further store results of testing operations that are received from one or more test servers configured to record the results of the testing operations with respect to both the optimized path and the standard path.

8. The electronic apparatus of claim 1, wherein the displayed results of the testing operations include one or more of:
    raw numerical values with respect to the timing;
    a subset of key statistics of interest;
    a graph illustrating latency differences between the optimized path and the standard path;
    a comparison of concurrent latency measurements performed across the optimized path and the standard path to demonstrate the performance improvements; and
    an indication showing for which portions of a network latency has improved by providing the optimized path for communicating packets associated with an application or a device.

9. The electronic apparatus of claim 1, wherein the electronic apparatus is one of:
    a cable modem (CM);
    a wireless router;
    a residential gateway (GW) device including an integrated CM and router;
    an access point (AP); or
    a customer premises equipment (CPE), wherein a CPE includes a set-top box (STB) or other local network connected device.

10. A method for enabling verification of performance improvements of an optimized service provided, the method comprising:
    receiving a request to perform testing operations with respect to the optimized service, wherein the request includes one or more parameters for configuring the testing operations, and wherein the optimized service is a low latency service provided by a service provider;
    transmitting test packets to a test server on a standard path and on an optimized path, wherein the optimized path is an optimized service flow for low latency traffic and the standard path is a service flow for regular non-low latency traffic;
    receiving the test packets from the test server via the standard path and the optimized path;
    performing measurements related to timing of the test packets on the standard path and the test packets on the optimized path, respectively;
    processing the respective measurements related to timing to generate results of the testing operations; and
    outputting the results of the testing operations to be displayed in response to the request, wherein the displayed results enable comparison of performance improvements between the optimized path and the standard path.

11. The method of claim 10, wherein:
    the request is received from a computing device of a subscriber of the optimized service or from a remote server device of the service provider, which presents a graphical user interface (GUI) that enables editing of the parameters and initiation of the testing operations; and
    the results of the testing operations are transmitted to the computing device of the subscriber or the remote server device of the service provider, wherein the GUI enables viewing of the results of the testing operations.

12. The method of claim 11, wherein the GUI displays options associated with the one or more parameters for configuring the testing operations, including one or more of:
    a particular application or game for which traffic is subjected to the testing operations;
    a short-term test with default parameters;
    a long-term test with default parameters;
    a default test server;
    a list of available test servers from which the test server is selected; and
    a custom test with configurable parameters, including one or more of:
    a field for entering a host name or IP address of a specific test server;
    a field for selecting or entering a protocol to be used for the measurements;
    a field for selecting or entering a minimum number of test packets;
    a field for selecting or entering a specified duration of the testing operations; and
    a field for selecting or entering a frequency or delay period between transmitting test packets.

13. The method of claim 10, further comprising:
    counting a number of test packets that take the optimized path and the standard path, respectively; and determining whether the number of test packets have exceeded a threshold value for the optimized path and the standard path.

14. The method of claim 10, further comprising:
performing passive latency measurements for the optimized path and the standard path by monitoring client-server interactions associated with an application or a device; and
performing active latency measurements for the optimized path and the standard path on demand in response to a command of a subscriber or the service provider.

15. The method of claim 10, further comprising:
monitoring traffic for an application or a device and reporting measurements or statistics derived from the traffic along with information provided via other components associated with one or more of Wi-Fi, DOCSIS, and MOCA;
generating test background traffic with varying traffic loads and taking directed measurements under the varying traffic loads; and
running one or more latency tests in parallel with respect to different test servers or different applications.

16. The method of claim 10, further comprising one or more of:
storing the results of the testing operations locally in a memory of an electronic apparatus;
transmitting the results of the testing operations to a remote server device to be stored remotely, wherein the results of the testing operations are saved to a user private area, a provider private area, or a public area of a remote database of the remote server device; and
retrieving previous results of the testing operations from the remote database of the remote server device, wherein the results and the previous results are aggregated to update information displayed via a GUI,
wherein the remote database may further store results of testing operations that are received from one or more test servers configured to record the results of the testing operations with respect to both the optimized path and the standard path.

17. The method of claim 10, wherein the displayed results of the testing operations include one or more of:
raw numerical values with respect to the timing;
a subset of key statistics of interest;
a graph illustrating latency differences between the optimized path and the standard path;
a comparison of concurrent latency measurements performed across the optimized path and the standard path to demonstrate the performance improvements; and
an indication showing for which portions of a network latency has improved by providing the optimized path for communicating packets associated with an application or a device.

18. A non-transitory computer-readable medium storing instructions for enabling verification of performance improvements of an optimized service, the instructions when executed by a processor of an electronic device causing the electronic device to perform operations comprising:
receiving a request to perform testing operations with respect to the optimized service, wherein the request includes one or more parameters for configuring the testing operations, and wherein the optimized service is a low latency service provided by a service provider;
transmitting test packets to a test server on a standard path and on an optimized path, wherein the optimized path is an optimized service flow for low latency traffic and the standard path is a service flow for regular non-low latency traffic;
receiving the test packets from the test server via the standard path and the optimized path;
performing measurements related to timing of the test packets on the standard path and the test packets on the optimized path, respectively;
processing the respective measurements related to timing to generate results of the testing operations; and
outputting the results of the testing operations to be displayed in response to the request, wherein the displayed results enable comparison of performance improvements between the optimized path and the standard path.

19. The non-transitory computer-readable medium of claim 18, wherein:
the request is received from a computing device of a subscriber of the optimized service or from a remote server device of the service provider, which presents a graphical user interface (GUI) that enables editing of the parameters and initiation of the testing operations; and
the results of the testing operations are transmitted to the computing device of the subscriber or the remote server device of the service provider, wherein the GUI enables viewing of the results of the testing operations.

20. The non-transitory computer-readable medium of claim 19, wherein the GUI displays options associated with the one or more parameters for configuring the testing operations, including one or more of:
a particular application or game for which traffic is subjected to the testing operations;
a short-term test with default parameters;
a long-term test with default parameters;
a default test server;
a list of available test servers from which the test server is selected; and
a custom test with configurable parameters, including one or more of:
a field for entering a host name or IP address of a specific test server;
a field for selecting or entering a protocol to be used for the measurements;
a field for selecting or entering a minimum number of test packets;
a field for selecting or entering a specified duration of the testing operations; and
a field for selecting or entering a frequency or delay period between transmitting test packets.

21. The non-transitory computer-readable medium of claim 18, wherein the instructions when executed by the processor further cause the electronic device to perform operations comprising:
counting a number of test packets that take the optimized path and the standard path, respectively; and
determining whether the number of test packets have exceeded a threshold value for the optimized path and the standard path.

22. The non-transitory computer-readable medium of claim 18, wherein the instructions when executed by the processor further cause the electronic device to perform operations comprising:
performing passive latency measurements for the optimized path and the standard path by monitoring client-server interactions associated with an application or a device; and performing active latency measurements for the optimized path and the standard path on demand in response to a command of a subscriber or the service provider.

23. The non-transitory computer-readable medium of claim 18, wherein the instructions when executed by the processor further cause the electronic device to perform operations comprising:
monitoring traffic for an application or a device and reporting measurements or statistics derived from the traffic along with information provided via other components associated with one or more of Wi-Fi, DOCSIS, and MOCA;
generating test background traffic with varying traffic loads and taking directed measurements under the varying traffic loads; and
running one or more latency tests in parallel with respect to different test servers or different applications.

24. The non-transitory computer-readable medium of claim 18, wherein the instructions when executed by the processor further cause the electronic device to perform operations comprising:
storing the results of the testing operations locally in a memory of an electronic apparatus;
transmitting the results of the testing operations to a remote server device to be stored remotely, wherein the results of the testing operations are saved to a user private area, a provider private area, or a public area of a remote database of the remote server device; and
retrieving previous results of the testing operations from the remote database of the remote server device, wherein the results and the previous results are aggregated to update information displayed via a GUI,
wherein the remote database may further store results of testing operations that are received from one or more test servers configured to record the results of the testing operations with respect to both the optimized path and the standard path.

25. The non-transitory computer-readable medium of claim 18, wherein the displayed results of the testing operations include one or more of:
raw numerical values with respect to the timing;
a subset of key statistics of interest;
a graph illustrating latency differences between the optimized path and the standard path;
a comparison of concurrent latency measurements performed across the optimized path and the standard path to demonstrate the performance improvements; and
an indication showing for which portions of a network latency has improved by providing the optimized path for communicating packets associated with an application or a device.

* * * * *